(12) United States Patent
Matsuoka

(10) Patent No.: US 10,234,707 B2
(45) Date of Patent: Mar. 19, 2019

(54) DISPLAY DEVICE

(71) Applicant: Japan Display Inc., Tokyo (JP)

(72) Inventor: Takaharu Matsuoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 143 days.

(21) Appl. No.: 15/345,800

(22) Filed: Nov. 8, 2016

(65) Prior Publication Data

US 2017/0160581 A1 Jun. 8, 2017

(30) Foreign Application Priority Data

Dec. 4, 2015 (JP) .................................. 2015-237493

(51) Int. Cl.
*G02F 1/1333* (2006.01)
*G02F 1/1335* (2006.01)

(52) U.S. Cl.
CPC .. *G02F 1/133308* (2013.01); *G02F 1/133345* (2013.01); *G02F 1/133512* (2013.01); *G02F 2001/133331* (2013.01); *G02F 2001/133334* (2013.01); *G02F 2202/28* (2013.01)

(58) Field of Classification Search
CPC ......... G02F 1/133345; G02F 1/133512; G02F 1/133308; G02F 2001/133334; G02F 2202/28; G02F 2001/133331; G02F 2001/133317

See application file for complete search history.

(56) References Cited

U.S. PATENT DOCUMENTS

| | | | | |
|---|---|---|---|---|
| 6,316,110 | B1* | 11/2001 | Anzaki | H01J 11/10 359/359 |
| 2012/0306791 | A1* | 12/2012 | Lee | G06F 3/041 345/173 |
| 2013/0300975 | A1* | 11/2013 | Suzuki | H05K 5/0017 349/58 |
| 2014/0152943 | A1* | 6/2014 | Dorjgotov | H05B 33/22 349/96 |
| 2014/0232969 | A1 | 8/2014 | Tsubaki et al. | |
| 2014/0375910 | A1* | 12/2014 | Tada | G06F 3/044 349/12 |

FOREIGN PATENT DOCUMENTS

JP 2014-160218 A 9/2014

* cited by examiner

*Primary Examiner* — Hoan C Nguyen
(74) *Attorney, Agent, or Firm* — K&L Gates LLP

(57) ABSTRACT

A display device includes a display panel and a display cover that is arranged being opposite to the display panel and covers a display surface of the display panel. The display cover includes a transmission region that transmits light from the display panel, a light shielding region that is arranged at an outer circumference of the transmission region and shields the light from the display panel, a first light shielding member arranged on a surface of a display panel side of the display cover in the light shielding region, and a translucent conductive film laminated on the first light shielding member.

6 Claims, 7 Drawing Sheets

DISPLAY DEVICE

CROSS-REFERENCE TO RELATED APPLICATIONS

This application claims priority from Japanese Application No. 2015-237493, filed on Dec. 4, 2015, the contents of which are incorporated by reference herein in its entirety.

BACKGROUND

1. Technical Field

The present invention relates to a display device.

2. Description of the Related Art

For example, as a display device mounted on an onboard car navigation system and the like, a liquid crystal display device is known. In the liquid crystal display device, a display surface of a liquid crystal display (LCD) panel is formed of a thin glass material. Due to this, when being exposed to externals, the LCD panel may possibly be broken because of an external force or an impact during use. Meanwhile, in some liquid crystal display devices, a transparent cover window (cover glass) through which the display surface can be visually recognized is fixed to the display surface side of the LCD panel. By providing the display surface side of the LCD panel with the cover window, the display surface of the LCD panel can be covered, and thus protected.

As a method of fixing the cover glass to the liquid crystal display device as described above, for example, Japanese Patent Application Laid-open Publication No. 2014-160218 discloses a liquid crystal display device in which the cover glass is fixed to the LCD panel by filling a transparent resin such as an ultraviolet (UV) curing resin therebetween. Such a structure of the liquid crystal display device in which the transparent resin is filled in a gap between the cover glass and the LCD panel is known as a screen fitting structure.

SUMMARY

In recent years, definition of liquid crystal display devices has become higher. Accordingly, it becomes harder to address electromagnetic compatibility (EMC) regulations, specifically, to take countermeasures against electromagnetic interference (EMI). In a conventional method of shielding electromagnetic wave noise emitted from an electronic apparatus, a noise emitting source is typically covered with conductive tape such as copper foil and aluminum foil. As a major configuration of the liquid crystal display device or electronic apparatuses on which the liquid crystal display device is mounted, a flexible printed circuit (FPC) and/or a driver IC and the like are arranged at an outer edge part of a display area of the LCD panel, and light shielding paint is applied to an outer edge part of the cover glass opposed to the outer edge part of the display area. In such a configuration, even employing the screen fitting structure as described above, it is difficult to shield the electromagnetic wave noise emitted from the FPC and/or the driver IC using the conductive tape and the like.

The present invention provides a display device that can easily take countermeasures against electromagnetic interference to the outside with a configuration in which a cover glass is arranged for covering a display surface of a display panel.

According to an aspect, a display device includes a display panel, and a display cover that is arranged opposite to the display panel and covers a display surface of the display panel. The display cover includes a transmission region that transmits light from the display panel, a light shielding region that is arranged at an outer circumference of the transmission region and shields the light from the display panel, a first light shielding member arranged on a surface of a display panel side of the display cover in the light shielding region, and a translucent conductive film laminated on the first light shielding member.

DETAILED DESCRIPTION

Figure 1:
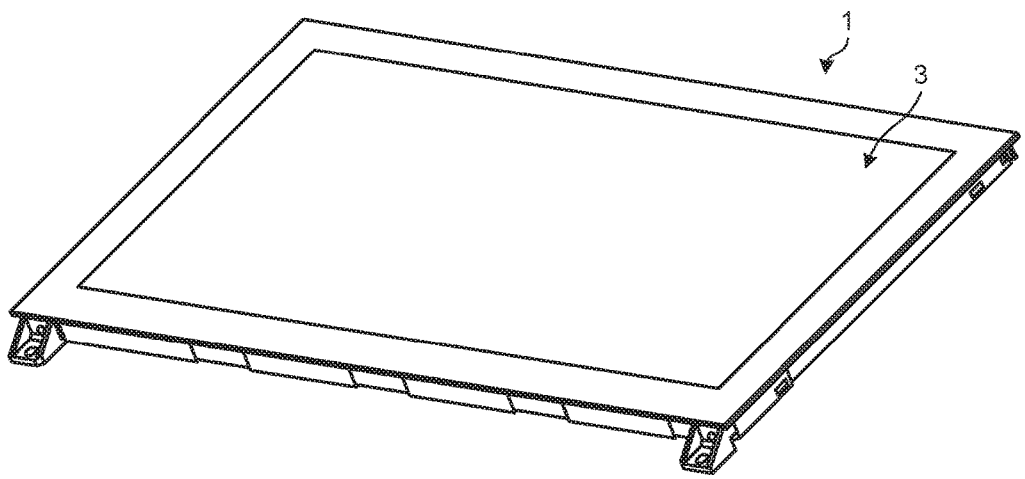
FIG. 1 is a whole perspective view of a display device according to a first embodiment.

The following describes preferred embodiments in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses an appropriate modification without being apart from the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will be omitted as appropriate in some cases.

First Embodiment

Figure 2:
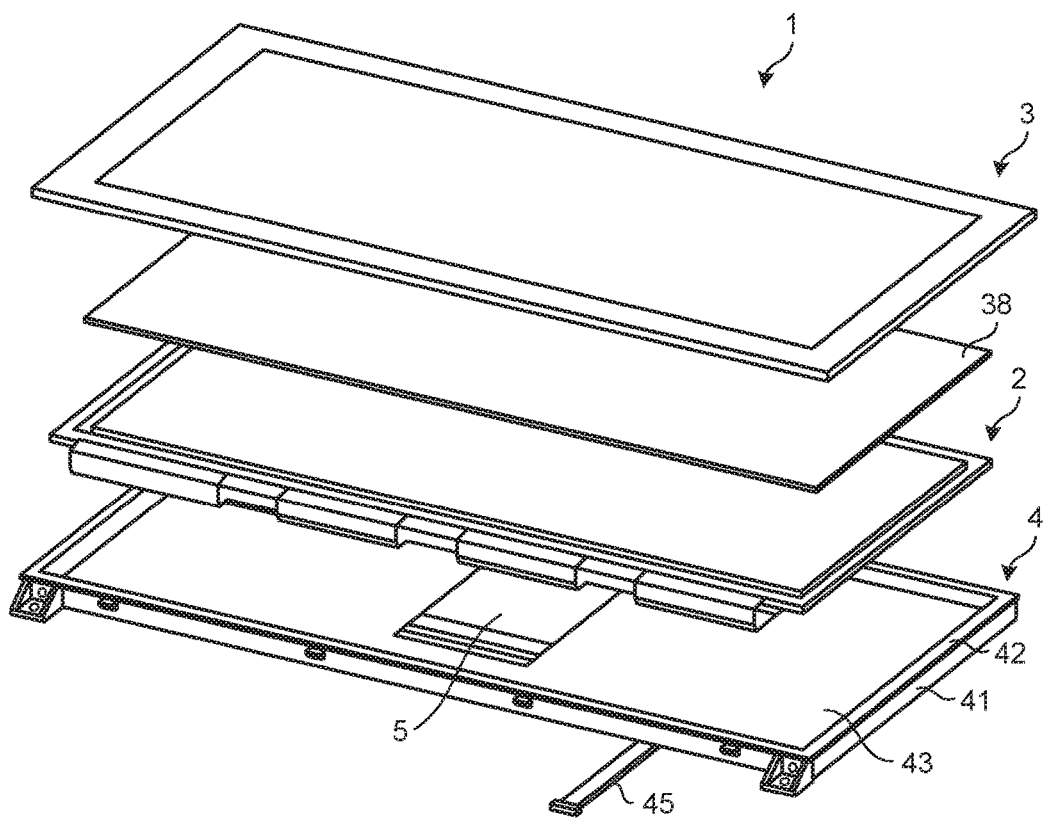
FIG. 2 is an exploded perspective view of the display device according to the first embodiment.
Figure 3:
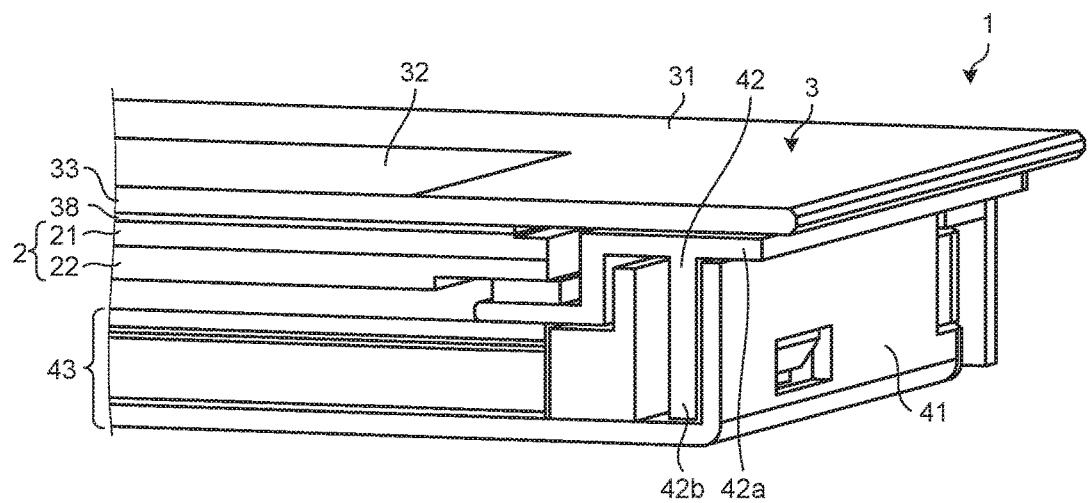
FIG. 3 is a cross-sectional view of an outer edge part of the display device according to the first embodiment.
Figure 4:
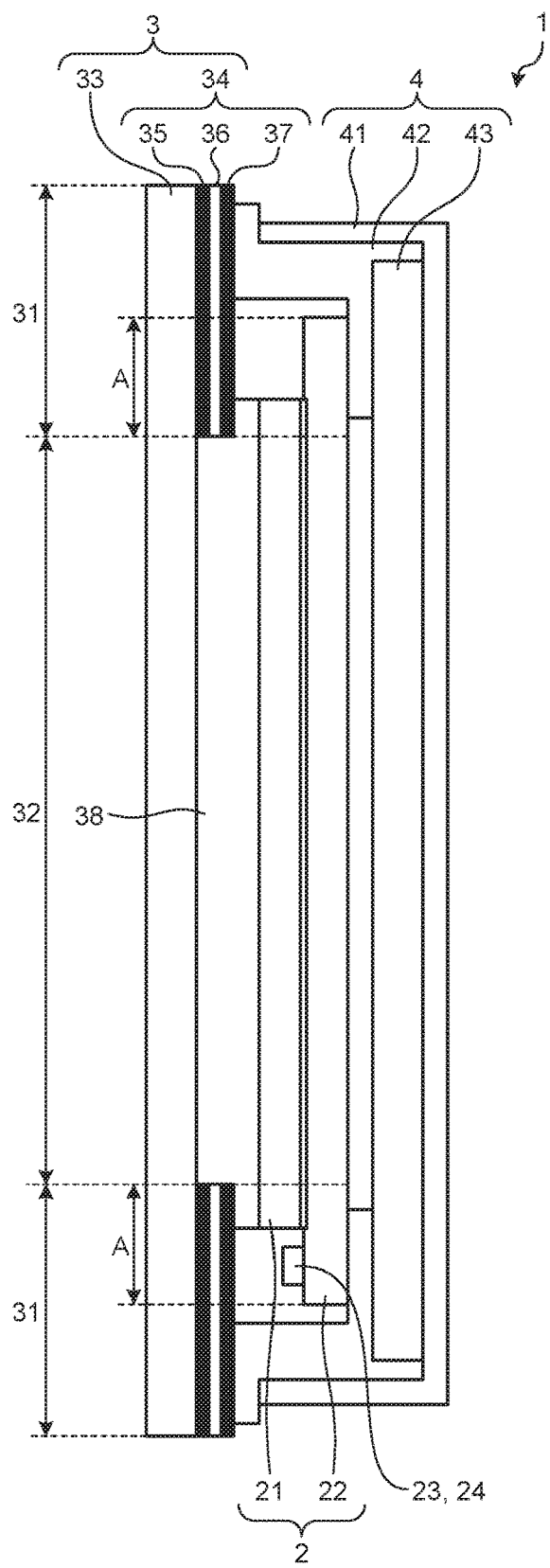
FIG. 4 is a schematic diagram illustrating a schematic vertical cross-sectional structure of the display device according to the first embodiment.

FIG. 1 is a whole perspective view of a display device according to a first embodiment. FIG. 2 is an exploded perspective view of the display device according to the first embodiment. FIG. 3 is a cross-sectional view of an outer edge part of the display device according to the first embodiment. FIG. 4 is a schematic diagram illustrating a schematic vertical cross-sectional structure of the display device according to the first embodiment. The following describes a configuration of a display device 1 according to the embodiment with reference to FIGS. 1 to 4.

As illustrated in FIGS. 1 and 2, this display device 1 according to the present embodiment is a liquid crystal display device including a liquid crystal (LCD) panel (display panel) 2, a cover glass (display cover) 3, and a backlight unit 4.

As illustrated in FIG. 3, the LCD panel 2 includes two transparent substrates 21 and 22. In the LCD panel 2, a liquid crystal layer is formed between the transparent substrate 21 and the transparent substrate 22. The LCD panel 2 according to the present embodiment is a fringe field switching (FFS) type liquid crystal display device. A drive electrode (common electrode) and pixel electrodes are laminated on one of the transparent substrates, and the pixel electrodes are formed corresponding to pixels and arranged in a matrix. On at least one of the two transparent substrates, for example, a liquid crystal cell is configured by arranging a color filter such that filters of R (red), G (green), B (blue) and the like are arranged to correspond to the pixels. Hereinafter, a region in which the liquid crystal cell is configured is referred to as a "display region".

In the LCD panel 2, an opening is formed on any one of the pixel electrode and the drive electrode (common), and the liquid crystal cell is driven by an electric field (fringe electric field) leaked from the opening. The LCD panel 2 switches transmission and shielding of light at each pixel based on an image signal to display an image. A surface of the LCD panel 2 on which pixels are arranged in a matrix, that is, a surface having the largest area (a panel surface, a front surface) is arranged in substantially parallel with an irradiation surface of the backlight unit 4 described later. The LCD panel 2 is the FFS type liquid crystal display device. Alternatively, liquid crystal display devices of an in-plane switching (IPS) type, a twisted nematic (TN) type, an optically compensated bend (or optically compensated birefringence) (OCB) type, and an electrically controlled birefringence (ECB) type may be used. The LCD panel 2 can use both of a normally black mode in which light is not transmitted and black display is obtained in a state a voltage is not applied, and a normally white mode in which light is transmitted and white display is obtained in a state a voltage is not applied.

As illustrated in FIG. 2, a flexible printed circuit (FPC) 5 is coupled to the LCD panel 2. The FPC 5 is coupled to an external apparatus (control device) that transmits a control signal to the LCD panel 2 to control a display operation.

The cover glass 3 is a glass member that is arranged opposite to a surface on a display side (hereinafter, referred to as a "display surface") of the LCD panel 2. The cover glass 3 includes a translucent plate-shaped glass substrate 33 as a base material that covers and accordingly protects the display surface of the LCD panel 2. The cover glass 3 is fixed to a cover glass supporting case 42. In the cover glass 3, a light shielding region 31 that shields light from the LCD panel 2 is arranged at an outer circumference of a region opposed to the display region of the LCD panel 2, and a transmission region 32 that transmits light from the LCD panel 2 is arranged inside the light shielding region 31.

As illustrated in FIG. 4, a laminate 34 is arranged in the light shielding region 31 of the cover glass 3. The laminate 34 includes a first light shielding member 35 printed by screen printing and the like on the glass substrate 33, a translucent conductive film 36, such as an ITO film made of indium tin oxide (ITO), deposited on a surface of the first light shielding member 35, and a second light shielding member 37 printed by screen printing and the like on a surface of the translucent conductive film 36. That is, the laminate 34 includes the translucent conductive film 36, and the first light shielding member 35 and the second light shielding member 37 that are arranged to sandwich the translucent conductive film 36 therebetween.

As illustrated in FIGS. 2, 3, and 4, the display surface of the LCD panel 2 is attached to the cover glass 3 with an optically clear resin (OCR) 38, which is an insulative optical adhesive agent having translucency, such as an ultraviolet (UV) curing resin. Accordingly, an insulating layer is formed between the cover glass 3 and the LCD panel 2. The UV curing resin is a synthetic resin that is chemically changed from liquid to a solid in response to light energy of ultraviolet rays. As the optically clear resin 38 forming the insulating layer, the UV curing resin is used herein. However, the embodiment is not limited thereto.

In the display device 1 according to the present embodiment, the cover glass 3 is arranged as a display cover for protecting the surface on the display side of the LCD panel 2, that is, for protecting the display surface, and the cover glass 3 is fixed to the LCD panel 2. However, the embodiment is not limited thereto. The display device 1 can use various display covers having a plate-shape and transmitting light so long as the surface of the LCD panel 2 can be protected and an image displayed on the LCD panel 2 can be transmitted therethrough. As the display cover, a transparent resin member or a touch panel can be used.

The backlight unit 4 includes a storage case 41, the cover glass supporting case 42 (display cover supporting case), and a backlight 43.

The storage case 41 is a rectangular box-shaped metal case that fixes and stores the LCD panel 2 and the backlight 43 and shields light irradiated from the backlight 43 such that the irradiated light does not leak to the outside. The storage case 41 has GND potential of the LCD panel 2 and the backlight 43, and exhibits a shielding effect for the LCD panel 2 with the panel surface of the LCD panel 2 being arranged in substantially parallel with the irradiation surface of the backlight 43.

The cover glass supporting case 42 includes an attachment plate 42a to which the cover glass 3 is attached in the light shielding region 31, and a side plate 42b extending from a surface on a light source side of the attachment plate 42a in a substantially perpendicular direction.

The cover glass supporting case 42 is fitted into the storage case 41 so that an outer face of the side plate 42b is opposite to an inner face of a side wall of the box-shaped storage case 41. A plurality of hook parts formed on the side plate 42b are inserted into an opening of the storage case 41 such that the cover glass supporting case 42 is fixed to the storage case 41. When the cover glass 3 to which the LCD panel 2 is bonded with the optically clear resin 38 is attached to the attachment plate 42a in the light shielding region 31, part of the cover glass supporting case 42 is opposite to the periphery of the LCD panel 2 to protect the LCD panel 2. As a method for bonding the cover glass 3 and the cover glass supporting case 42, for example, double-sided adhesive tape or an adhesive agent may be used, or a plurality of boding members such as double-sided tape and the adhesive agent may be used in combination. The method for bonding the cover glass 3 and the cover glass supporting case 42 does not limit the present invention.

The backlight 43 has a mechanism that irradiates the LCD panel 2 with light, and arranged to face the LCD panel 2. The backlight 43 includes a light source, a light guide plate, and an optical sheet. The light source outputs light. The light guide plate receives incident light that is output from the light source and guides the incident light such that the incident light is irradiated to the LCD panel 2. The optical sheet is laminated on a light irradiation surface side of the light guide plate. As the light source, a light emitting diode (LED) and/or a fluorescent light can be used. In the light source, a flexible cable 45 illustrated in FIG. 2 extends to the outside of the storage case 41 and the cover glass supporting case 42. The backlight 43 includes an optical sheet support member arranged on one side of the rectangular light guide plate. The optical sheet support member fixes the optical sheet arranged on a display side of the light guide plate. In the present embodiment, although light is output from an emitting surface of the light guide plate using the light guide plate as the backlight 43, the embodiment is not limited thereto. As the backlight 43, a point light source such as an LED and/or a line light source such as a cold-cathode tube (CCFL) may be used. A plurality of point light sources and line light sources may be arranged in the backlight 43 such that incident light is received by the entire display surface of the LCD panel 2.

A coupling part 23 for the FPC 5, a driver IC 24 of the LCD panel 2, and the like are arranged in a region A outside the display region of the LCD panel 2 opposite to the transmission region 32 of the cover glass 3 illustrated in FIG. 4. These components such as the coupling part 23 for the FPC 5 and the driver IC 24 arranged in the region A of the LCD panel 2 possibly become a generating source of electromagnetic wave noise. As described above, the laminate 34 arranged in the light shielding region 31 of the cover glass 3 is configured to include the translucent conductive film 36 made of ITO, for example, and the first light shielding member 35 and the second light shielding member 37 arranged to sandwich the translucent conductive film 36 therebetween, and thus the display device 1 according to the present embodiment can shield the electromagnetic wave noise generated from the components such as the coupling part 23 for the FPC 5 and the driver IC 24 and suppress electromagnetic interference to the outside.

Also, the liquid crystal cell configuring the display region of the LCD panel 2 possibly becomes the generating source of the electromagnetic wave noise. As described above, the optically clear resin 38, which is an insulative optical adhesive agent having translucency, is arranged between the LCD panel 2 and the cover glass 3, and thus the display device 1 according to the present embodiment can suppress the electromagnetic interference to the outside due to the electromagnetic wave noise generated from the liquid crystal cell of the LCD panel 2.

In the example described above, the ITO film is used as the translucent conductive film 36 configuring the laminate 34. However, the type of the translucent conductive film 36 is not limited thereto.

In the example described above, the laminate 34 arranged in the light shielding region 31 of the cover glass 3 includes the first light shielding member 35 printed by screen printing and the like on the glass substrate 33, the translucent conductive film 36 deposited on the surface of the first light shielding member 35, and the second light shielding member 37 printed by screen printing and the like on the surface of the translucent conductive film 36. However, the effect of the first embodiment described above can be obtained even if the second light shielding member 37 is not arranged. When the second light shielding member 37 is not arranged, the light irradiated from the backlight 43 is reflected from the translucent conductive film 36, which may deteriorate display quality. By arranging the second light shielding member 37 on the surface of the translucent conductive film 36, reflection inside the display device 1 can be suppressed, and deterioration in display quality can be prevented.

In the example described above, the LCD panel 2 is attached and accordingly fixed to the cover glass 3 using the optically clear resin 38 as the insulative optical adhesive agent having translucency. An insulative optically clear adhesive (OCA) may be used in place of the optically clear resin 38. An air layer may be arranged between the LCD panel 2 and the cover glass 3 when the optical adhesive agent such as the optically clear resin 38 and the OCA is not used as a method of fixing the LCD panel 2 to the cover glass 3. The insulating layer interposed between the LCD panel 2 and the cover glass 3 does not limit the present invention.

As described above, regarding the display device 1 according to the first embodiment in which the cover glass 3 is arranged on the display surface of the LCD panel 2, the laminate 34 arranged in the light shielding region 31 of the cover glass 3 is configured to include the first light shielding member 35 arranged on the glass substrate 33 and the translucent conductive film (for example, an ITO film) 36 arranged on the surface of the first light shielding member 35, and thus, even if the electromagnetic wave noise is generated from the components such as the coupling part 23 for the FPC 5 and the driver IC 24 arranged in the region A on the outside of the display region of the LCD panel 2 opposite to the transmission region 32 of the cover glass 3, the electromagnetic wave noise can be shielded, and countermeasures against the electromagnetic interference to the outside can be easily taken.

By arranging the insulating layer between the LCD panel 2 and the cover glass 3, the electromagnetic interference to the outside due to the electromagnetic wave noise generated from the liquid crystal cell of the LCD panel 2 can be suppressed.

By arranging the second light shielding member 37 on the surface of the translucent conductive film 36, reflection inside the display device 1 can be suppressed, and deterioration in display quality can be prevented.

Second Embodiment

Figure 5:
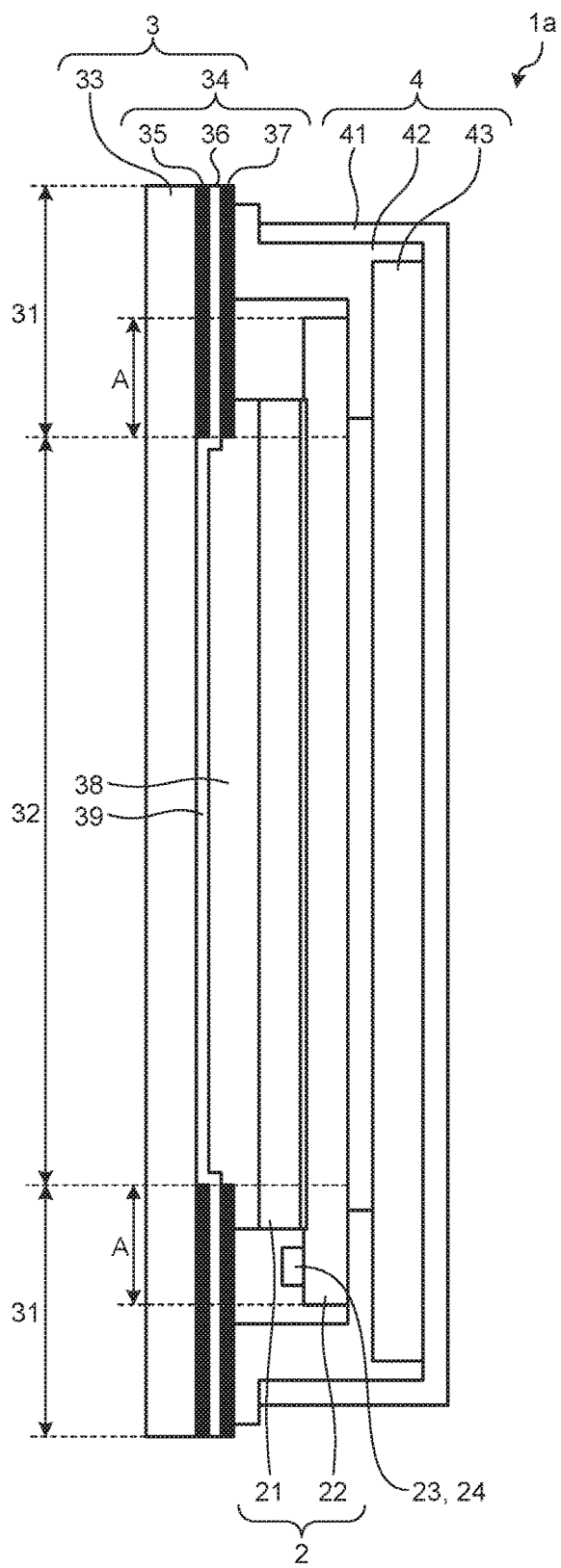
FIG. 5 is a schematic diagram illustrating a schematic vertical cross-sectional structure of a display device according to a second embodiment.

FIG. 5 is a schematic diagram illustrating a schematic vertical cross-sectional structure of the display device according to a second embodiment. The same components as those described in the first embodiment are denoted by the same reference numerals, and redundant description will be omitted.

As illustrated in FIG. 5, regarding a display device 1a according to the second embodiment, translucent conductive films 36 and 39 such as an ITO film are arranged on the entire surface of the cover glass 3 including the transmission region 32 of the cover glass 3 opposite to the display region of the LCD panel 2 in addition to the surface of the first light shielding member 35. Accordingly, the electromagnetic interference to the outside due to the electromagnetic wave noise generated from the liquid crystal cell of the LCD panel 2 can be suppressed more effectively than the first embodiment.

Third Embodiment

Figure 6:
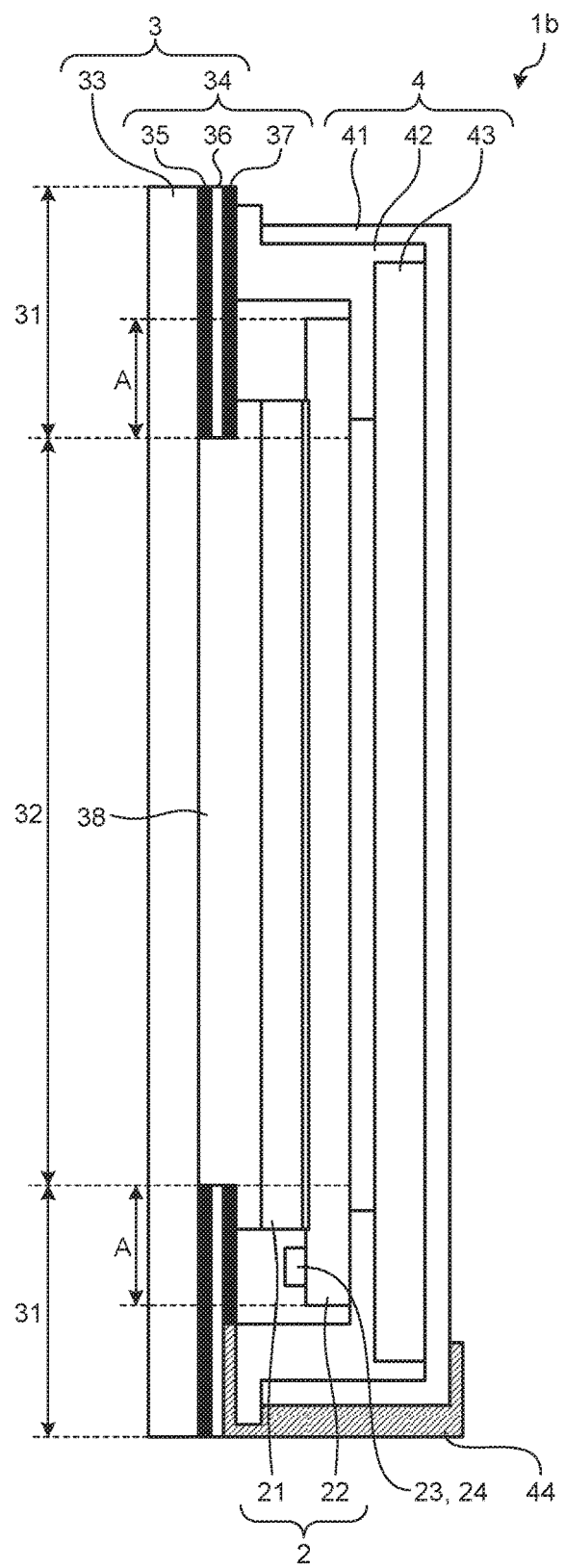
FIG. 6 is a schematic diagram illustrating a schematic vertical cross-sectional structure of a display device according to a third embodiment.
Figure 7:
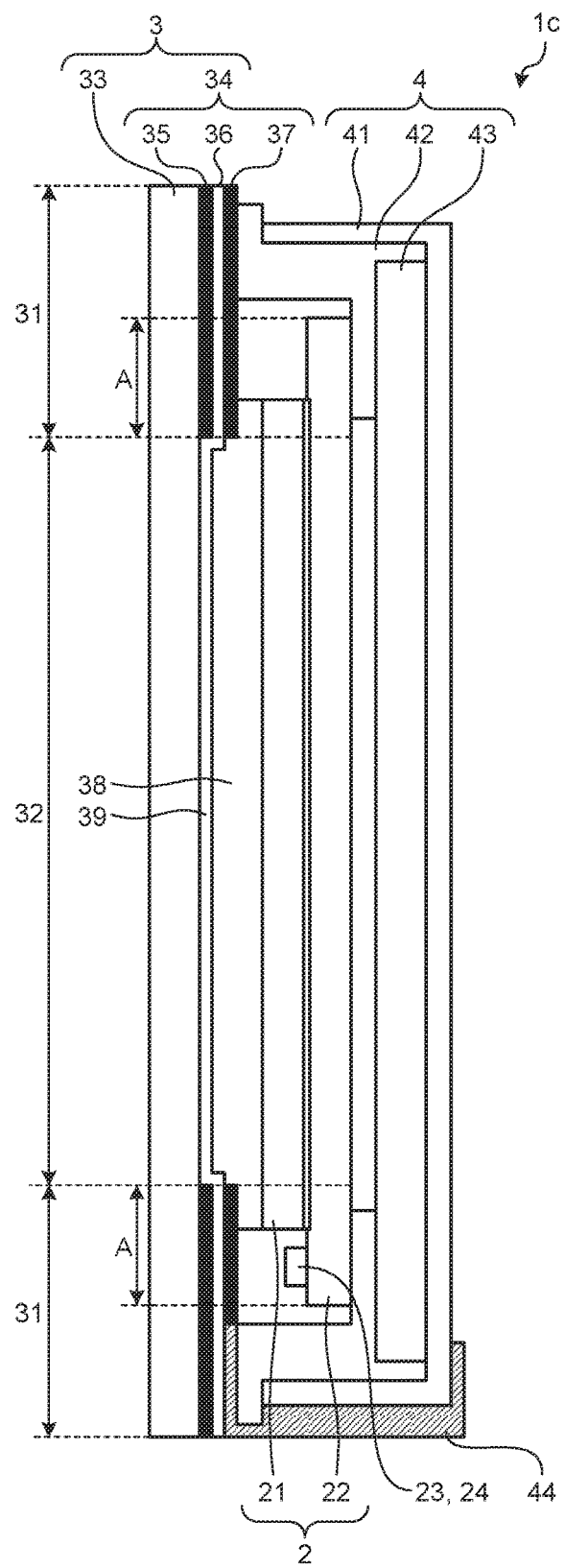
FIG. 7 is a schematic diagram illustrating a schematic vertical cross-sectional structure of a display device different from that in FIG. 6 according to the third embodiment.

FIG. 6 is a schematic diagram illustrating a schematic vertical cross-sectional structure of the display device according to a third embodiment. FIG. 7 is a schematic diagram illustrating a schematic vertical cross-sectional structure of a display device different from that in FIG. 6 according to the third embodiment. The same components as those described in the first and second embodiments are denoted by the same reference numerals, and redundant description will be omitted.

Regarding a display device 1*b* according to the third embodiment illustrated in FIG. 6, in contrast to the display device 1 according to the first embodiment, the translucent conductive film 36 is electrically coupled through a conductive member 44 such as conductive tape to the metal storage case 41 having the GND potential of the LCD panel 2 and the backlight 43. Accordingly, even if the electromagnetic wave noise is generated from the components such as the coupling part 23 for the FPC 5 and the driver IC 24 arranged in the region A on the outside of the display region of the LCD panel 2 opposite to the transmission region 32 of the cover glass 3, the electromagnetic wave noise can be shielded more efficiently than the first embodiment.

Regarding a display device 1*c* according to the third embodiment illustrated in FIG. 7, in contrast to the display device 1*a* according to the second embodiment, the translucent conductive films 36 and 39 are electrically coupled through the conductive member 44 such as conductive tape to the metal storage case 41 having the GND potential of the LCD panel 2 and the backlight 43. Accordingly, the electromagnetic interference to the outside due to the electromagnetic wave noise generated from the liquid crystal cell of the LCD panel 2 can be suppressed more effectively than the second embodiment.

In the embodiments described above, described is a configuration example of the liquid crystal display device using the liquid crystal (LCD) panel as the display panel. However, the display panel is not limited thereto. For example, it is needless to say that a working effect as described above in the embodiments can be obtained even with a configuration using a self-luminous body such as an organic EL panel as the display panel.

The components in the embodiments described above can be appropriately combined. The present invention naturally encompasses other working effects caused by the aspects described in the above embodiments that are obvious from the description herein or that are appropriately conceivable by those skilled in the art.

What is claimed is:

1. A display device comprising:
    a display panel; and
    a display cover that is arranged opposite to the display panel and covers a display surface of the display panel, the display cover including:
        a transmission region that transmits light from the display panel;
        a light shielding region that is arranged at an outer circumference of the transmission region and shields the light from the display panel;
        a first light shielding member arranged on a surface of a display panel side of the display cover in the light shielding region; and
        a translucent conductive film laminated on the first light shielding member,
    wherein the light shielding region further includes, in a laminated manner, a second light shielding member, the translucent conductive film being sandwiched between the first light shielding member and the second light shielding member.

2. The display device according to claim 1, wherein a translucent conductive film is arranged on an entire surface of the display cover including the transmission region.

3. The display device according to claim 1, further comprising:
    a metal storage case that stores therein the display panel and has GND potential of the display panel; and
    a conductive member that electrically couples the translucent conductive film to the storage case.

4. The display device according to claim 1, wherein an insulating layer is arranged between the display cover and the display panel.

5. The display device according to claim 4, wherein the insulating layer is an optical adhesive agent having translucency.

6. The display device according to claim 4, wherein the insulating layer is an air layer.

* * * * *